US012744871B2

(12) United States Patent
Ledergerber et al.

(10) Patent No.: US 12,744,871 B2
(45) **Date of Patent: *Sep. 22, 2026**

(54) SYSTEMS AND METHODS FOR PROCESSING TIME OF FLIGHT SENSOR DATA

(71) Applicant: Verity AG, Zurich (CH)

(72) Inventors: Anton Josef Ledergerber, Winterthur (CH); Markus Florian Hehn, Zurich (CH); Tomislav Horvat, Baden (CH)

(73) Assignee: Verity AG, Zurich (CH)

( * ) Notice: Subject to any disclaimer, the term of this patent is extended or adjusted under 35 U.S.C. 154(b) by 40 days.

This patent is subject to a terminal disclaimer.

(21) Appl. No.: 18/884,751

(22) Filed: Sep. 13, 2024

(65) Prior Publication Data

US 2025/0008067 A1 Jan. 2, 2025

Related U.S. Application Data

(63) Continuation of application No. 17/536,984, filed on Nov. 29, 2021, now Pat. No. 12,095,963.

(60) Provisional application No. 63/118,756, filed on Nov. 27, 2020.

(51) Int. Cl.

*H04N 13/106* (2018.01)
*G06T 7/50* (2017.01)
*H04N 13/00* (2018.01)
*H04N 13/254* (2018.01)

(52) U.S. Cl.

CPC ............ *H04N 13/106* (2018.05); *G06T 7/50* (2017.01); *H04N 13/254* (2018.05); *G06T 2207/10028* (2013.01); *G06T 2207/10032* (2013.01); *G06T 2207/20081* (2013.01); *G06T 2207/20084* (2013.01); *H04N 2013/0081* (2013.01)

(58) Field of Classification Search

CPC ............... H04N 13/106; H04N 13/254; H04N 2013/20081; G06T 7/50; G06T 2207/10028; G06T 2207/10032; G06T 2207/20084; G06T 2207/20081

See application file for complete search history.

(56) References Cited

U.S. PATENT DOCUMENTS

2018/0101173 A1* 4/2018 Banerjee .................. G08G 5/80
2021/0302550 A1* 9/2021 Dutton .................. G01S 17/894
2021/0318443 A1* 10/2021 Ding ....................... G01S 17/36
2022/0012903 A1* 1/2022 Vyas ......................... G06T 3/40
2022/0174251 A1 6/2022 Ledergerber (Continued)

FOREIGN PATENT DOCUMENTS

CN 113240604 B * 9/2022 ........... G06N 3/0454

*Primary Examiner* — Rowina J Cattungal
(74) *Attorney, Agent, or Firm* — HG LAW LLP

(57) ABSTRACT

Systems and methods are provided for processing time of flight (ToF) data generated by a ToF camera. Such systems and methods may comprise receiving the ToF data comprising fine depth data and coarse depth data of an environment, processing the received coarse depth data in real time to generate one of a coarse three-dimensional (3D) representation or an intensity image of the environment, storing the received fine depth data and the coarse depth data, and processing the stored fine depth data and the coarse depth data, at a later time, to generate a fine 3D representation of the environment.

22 Claims, 6 Drawing Sheets

(56) References Cited

U.S. PATENT DOCUMENTS

2022/0252730 A1* 8/2022 Van Nieuwenhove ...................... G01S 17/36
2022/0292332 A1* 9/2022 Koumura .............. G06N 3/045

* cited by examiner

SYSTEMS AND METHODS FOR PROCESSING TIME OF FLIGHT SENSOR DATA

CROSS-REFERENCE TO RELATED APPLICATION

This application claims the benefit of U.S. application Ser. No. 17/536,984, filed Nov. 29, 2021, which claims the benefit of U.S. Provisional Application No. 63/118,756 filed Nov. 27, 2020, the disclosure of each of which is hereby incorporated by reference herein in its entirety.

INTRODUCTION

The present disclosure relates to selectively processing time of flight (ToF) data generated by a ToF camera. In particular, coarse depth data may be processed in real time to generate one of a coarse three-dimensional (3D) representation or an intensity image of an environment, and fine depth data may be processed at a later time to generate a fine 3D representation of the environment.

SUMMARY

Many devices (e.g., smartphones, drones, 3D scanners) require real-time situational awareness and are also used to record their spatial environment, and it may be desirable to use the same sensors for both purposes. However, situational awareness may prioritize low latency and high frame rates but not high precision, whereas recording may prioritize high precision over latency. One sensor that can be used for both purposes is the ToF camera.

Continuous-wave ToF cameras provide better depth/distance precision at higher modulation frequencies and a longer unambiguous range at lower frequencies. Such fundamental precision-range tradeoff stems from the fact that continuous-wave ToF cameras measure the distance d via the phase difference φ between the emitted and reflected light by: $d=(\varphi*c)/(4*\pi*fmod)$, where c is the speed of light and fmod is the modulation frequency. Therefore, the resolution and precision of these cameras can in general be improved by reducing the distance difference to phase difference ratio, i.e. by increasing the modulation frequency. However, this comes at the cost of a reduced unambiguous range, which is calculated as $dmax=c/(2*fmod)$.

A short unambiguous range can be problematic for spatial or situational awareness, as given an unambiguous range of 2.5 m, an object appearing at a measured distance of d=0.5 m might in fact be at d=3 m. This makes it very challenging to properly react to such a new object without making bold assumptions. A low depth precision can be problematic for a high-fidelity recording. First, it may be more difficult to stitch together depth images of a low precision, which may hinder larger reconstructions of objects or environments. Second, depth images of low precision may be inadequate for inspection tasks, e.g., it may be difficult or impossible to measure the accurate dimensions of an object, or to see whether the object is damaged, based on such depth images of low precision.

In one approach, to increase unambiguous range without compromising depth/distance precision, some ToF cameras employ a lower frequency modulation signal to unwrap the ambiguous range provided by the higher frequency modulation signal which in general offers more distance precision. In another approach, some ToF cameras employ two modulation frequencies in a similar range, but then look for the range at which the two modulation frequencies agree best. In another approach, some ToF cameras use a coded modulation signal to disambiguate phase measurements.

Pulse-based, single or multi-gated ToF cameras have a similar tradeoff between the maximum range and range resolution. A larger pulse width leads to longer range whereas a shorter pulse width leads to a better range resolution. Signals employing different pulse width and range-shifting techniques can be used to circumvent this tradeoff. A similar tradeoff needs to be made in the direct ToF camera, where a high pulse repetition frequency leads to a better signal to noise ratio at the cost of a lower unambiguous range.

All of these ToF cameras generate a lot of data, be it for the different phase-stepped measurements from the low and high frequency modulation signals combined into a distance estimate, the multiple measurements needed to decode a coded modulation signal or the signals resulting from different pulse widths or from pulse-shifting techniques. It has been generally observed that processing this data stream in real time on autonomous robotic platforms/devices comprising the ToF camera and having limited computational resources is challenging, but may be necessary for spatial awareness and safe navigation of the autonomous platform.

One approach has attempted to solve this problem by reducing the frame rate of the ToF camera, by employing a ToF camera with a low pixel resolution, or by down sampling a high pixel resolution output. However, such approaches may be undesirable because a low frame rate and large latency may prevent the autonomous robot from quickly reacting to its environment, and a low pixel resolution prevents the robot from perceiving small static or dynamic objects. Another approach involves dedicated ToF data processing hardware, such as FPGAs or vision processing units, to offload computation, but such approach may be undesirable due to the associated added cost and increase in system complexity.

In accordance with the present disclosure, limitations of current systems for processing ToF sensor data have been reduced or eliminated. The present disclosure enables general real-time environmental awareness and high-fidelity reconstructions for robotic platforms/devices with limited computational resources. Systems, apparatuses, and methods provided herein are configured to perform processing of ToF data generated by a ToF camera by receiving the ToF data comprising fine depth data and coarse depth data of an environment, processing the received coarse depth data in real time to generate one of a coarse three-dimensional (3D) representation or an intensity image of the environment, storing the received fine depth data and the coarse depth data, and processing the stored fine depth data and the coarse depth data, at a later time, to generate a fine 3D representation of the environment.

In some embodiments, the generated coarse 3D representation comprises a low-fidelity point cloud and wherein the generated fine 3D representation comprises a high-fidelity point cloud.

In some embodiments, the systems, apparatuses, and methods provided herein further comprise determining whether the one of the coarse 3D representation or the intensity image meets a particular criteria, wherein the storing of the fine depth data and the coarse depth data may be performed in response to determining the particular criteria is met. In some embodiments, determining whether the particular criteria is met comprises one of determining whether a depth value of the coarse 3D representation is less than a predefined threshold, or determining whether a particular scene or event is detected based on the coarse depth data or the intensity image. In some embodiments, the ToF data comprises image frames, and the storing of the fine depth data and the coarse depth data in response to determining the particular criteria is met comprises identifying which image frames to store or identifying which pixel regions of the image frames to store.

In some embodiments, the systems, apparatuses, and methods provided herein further comprise updating a coarse depth data processing parameter in dependence on the fine 3D representation and the coarse depth data, and storing the updated coarse depth data processing parameter.

In some embodiments, the coarse depth data and the fine depth data may be determined based on one of: a high frequency modulation signal emitted by the ToF camera, associated with the fine depth data, and a low frequency modulation signal emitted by the ToF camera, associated with the coarse depth data; a first signal emitted by the ToF camera corresponding to a relatively larger pulse width and associated with the coarse depth data, and a second signal emitted by the ToF camera corresponding to a relatively smaller pulse width and associated with the fine depth value; a coded modulation signal; or a first signal emitted by the ToF camera and having a relatively lower pulse repetition frequency, wherein a second signal with a relatively higher pulse repetition frequency corresponding to the fine depth data is adjusted based on a distance extracted from the coarse depth data.

In some embodiments, the processing of the fine depth data and the coarse depth data to generate the fine 3D representation of the environment is performed while the ToF camera is not detecting its environment or is performed at a remote computing device.

In some embodiments, the systems, apparatuses, and methods provided herein further comprise training a neural network to accept as input a coarse depth value or an intensity value of a pixel and output a prediction of a fine depth value of the pixel associated with the input. In some embodiments, the ToF data comprises image frames of raw, phase-stepped measurements of low and high frequency signals.

In some embodiments, an autonomous aerial vehicle may be provided, comprising a ToF camera configured to generate ToF data of an environment outside of the autonomous aerial vehicle, wherein the ToF data comprises fine depth data and coarse depth data. The autonomous aerial vehicle may further comprise memory, and processing circuitry configured to receive the ToF data, process the received coarse depth data in real time to generate one of a coarse three-dimensional (3D) representation or an intensity image of the environment, store the received fine depth data and the coarse depth data, and process the stored fine depth data and the coarse depth data, at a later time, to generate a fine 3D representation of the environment.

BRIEF DESCRIPTION OF THE DRAWINGS

Embodiments of the present disclosure are illustrated by way of example and not limitation in the figures of the accompanying drawings, in which like references indicate similar elements and in which.

DETAILED DESCRIPTION

Figure 1:
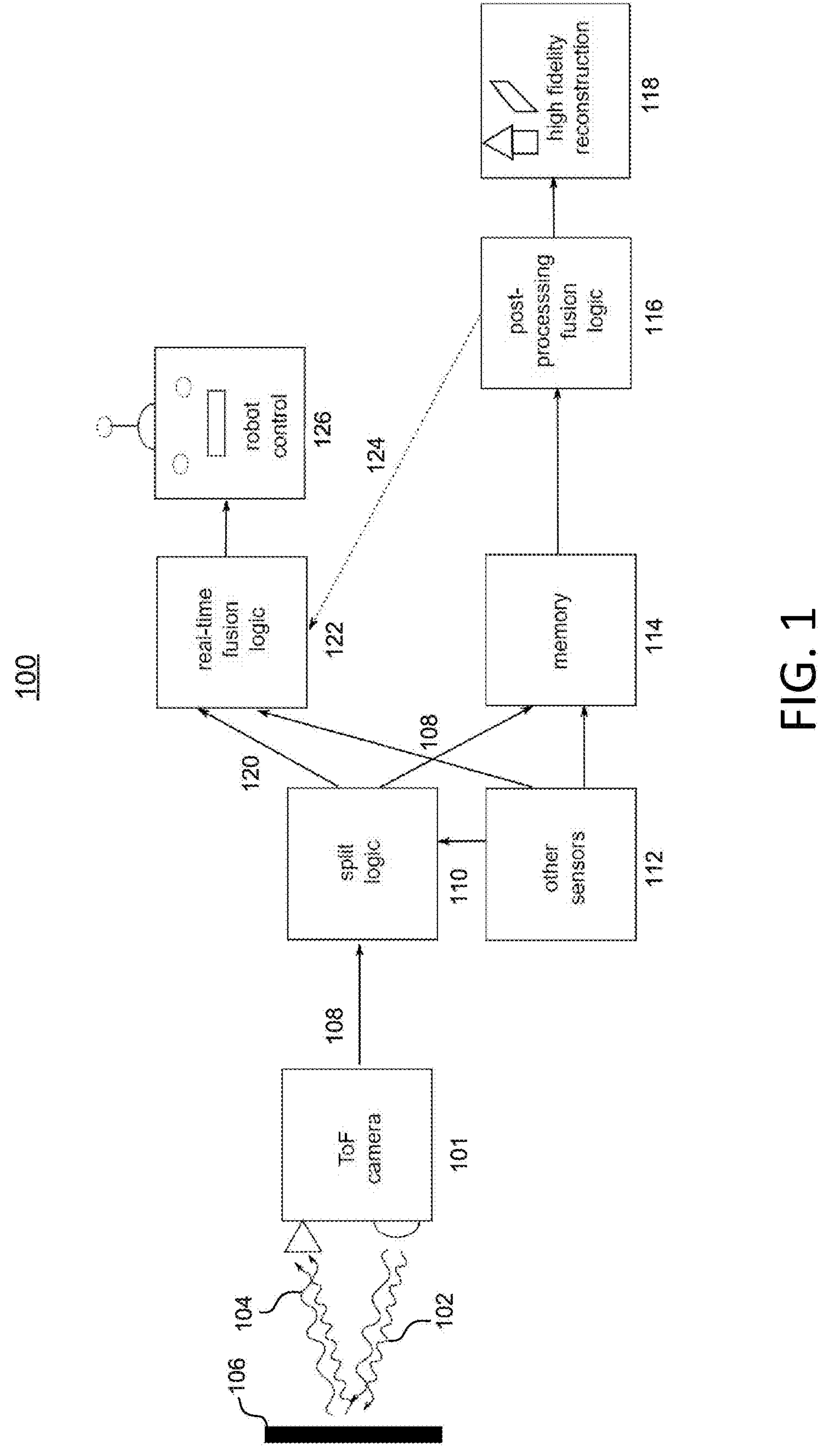
FIG. 1 is a block diagram of an illustrative system for processing time of flight (ToF) data generated by a ToF camera, in accordance with some embodiments of the present disclosure.

FIG. 1 is a block diagram of an illustrative system for processing time of flight (ToF) data generated by ToF camera 10, in accordance with some embodiments of the present disclosure. System 100 comprises ToF camera 101 configured to emit light 102 to portions of an environment surrounding ToF camera 101, e.g., towards object 106 in the environment, and detect light 104 reflected by portions of the environment, e.g., object 106. In some embodiments, light 102 and 26 may be reflected infrared (IR) light, near IR light, visible light, or any combination thereof. ToF camera 101 may determine depth data (as well as amplitude or intensity data) of one or more points of a scene or environment surrounding ToF camera 101 based on emitted light 102 and reflected light 104. ToF camera 101 may simultaneously output, with the depth data, amplitude or intensity information (e.g., a 2D intensity image or video of the environment) based on an amount of the light 104 returning to ToF camera 101. In some embodiments, such depth data may comprise coarse or lower precision depth data, as well as fine or higher precision depth data. The coarse depth data may be used to generate a low-fidelity, coarse three-dimensional (3D) representation of the environment in real-time, and the fine depth data may be used (e.g., along with the coarse depth data) to generate a fine, high-fidelity 3D representation at a later time.

In some embodiments, a direct ToF technique may be employed in which ToF camera 101 may output depth data (as well as amplitude or intensity data) of one or more points of a scene or environment surrounding ToF camera 101 based on measuring a time delay between emitting a pulse of light 102 and receiving reflected light 104 at ToF camera 101. For example, in the direct ToF technique, the pulse repetition frequency for a signal corresponding to the fine depth data may be adjusted based on the distance extracted from a signal corresponding to the coarse depth data. The pulse repetition frequency of light emitted by ToF camera 101 (and associated with the coarse depth data) may correspond to a relatively low pulse repetition frequency (e.g., and thus associated with a higher unambiguous range), and a pulse repetition frequency of light emitted by ToF camera 101 (and associated with the fine depth data) may correspond to a relatively higher pulse repetition frequency (e.g., and thus associated with a better signal to noise ratio). For example, ToF camera 101 may comprise one or more single-photon avalanche-diodes (SPADs) image sensors, and to measure depth information, a histogram may be generated indicating a number of photons received and time stamps indicating when each photon was received. Based on the counted number of photons for each time window indicated in the histogram, a signal peak may be identified and extracted from the histogram for use in determining depth data. If coarse depth data indicates that a particular scene is located between 3 m to 10 m from ToF camera 10, the pulse repetition may be adjusted accordingly to acquire fine depth data within the unambiguous range (e.g., a larger distance may indicate that a lower repetition frequency should be employed, whereas a shorter distance may indicate that a higher repetition frequency should be employed). In some embodiments, parameters (e.g., collection times) of the SPADs may be adjusted to facilitate the acquisition of the fine depth data.

In some embodiments, ToF camera 101 may be configured to modulate light 102, e.g., as a continuous wave (e.g., square wave or sinusoid wave), at a particular modulation frequency, such as, for example, as part of an indirect ToF technique. In such indirect ToF technique, camera 101 may output depth information of one or more points of a scene or environment surrounding ToF camera 101 based on measuring a phase difference between a phase of modulated light 102 and a phase of reflected light 104.

In some embodiments, the coarse depth data and the fine depth data may be determined based on continuous-wave, dual frequency, indirect ToF technique employing a high frequency modulation signal (used to determine the fine depth data) and a low frequency modulation signal (used to determine the coarse depth data). In some embodiments, a pulse-based indirect ToF technique may be employed, where the coarse depth data may be determined based on a signal with larger pulse width, and the fine depth data comes may be determined based on a signal with smaller pulse width. In some embodiments, a coded modulation signal may be employed, where coarse depth data may be decoded, and the fine depth data may be determined in a later, additional step.

The distance or depth d may be measured via the phase difference φ between the emitted and reflected light by:

$$d = \frac{\varphi * c}{4\pi * f\mathrm{mod}}$$

and an unambiguous range (dmax) of the ToF camera may be calculated by:

$$d\mathrm{max} = \frac{c}{2 * f\mathrm{mod}}$$

where φ is the phase difference between emitted light 102 and reflected light 104, c is the speed of light, and fmod is the modulation frequency. As discussed, an indirect ToF technique may be utilized which employs a high frequency modulation signal (used to determine the fine depth data) and a low frequency modulation signal (used to determine the coarse depth data). Processing the coarse depth data in real time may leverage the fact that situational awareness (e.g., while vehicle 202 of FIG. 2, which may comprise camera 10, is navigating the environment, and when computational resources may be limited) may not require high precision, and the lower frequency signal may allow for a longer unambiguous range. On the other hand, the fine depth data may be processed at a later time (e.g., when vehicle 202 is being charged) to obtain higher precision representation of the environment, when more robust computational resources may be available.

Figure 2:
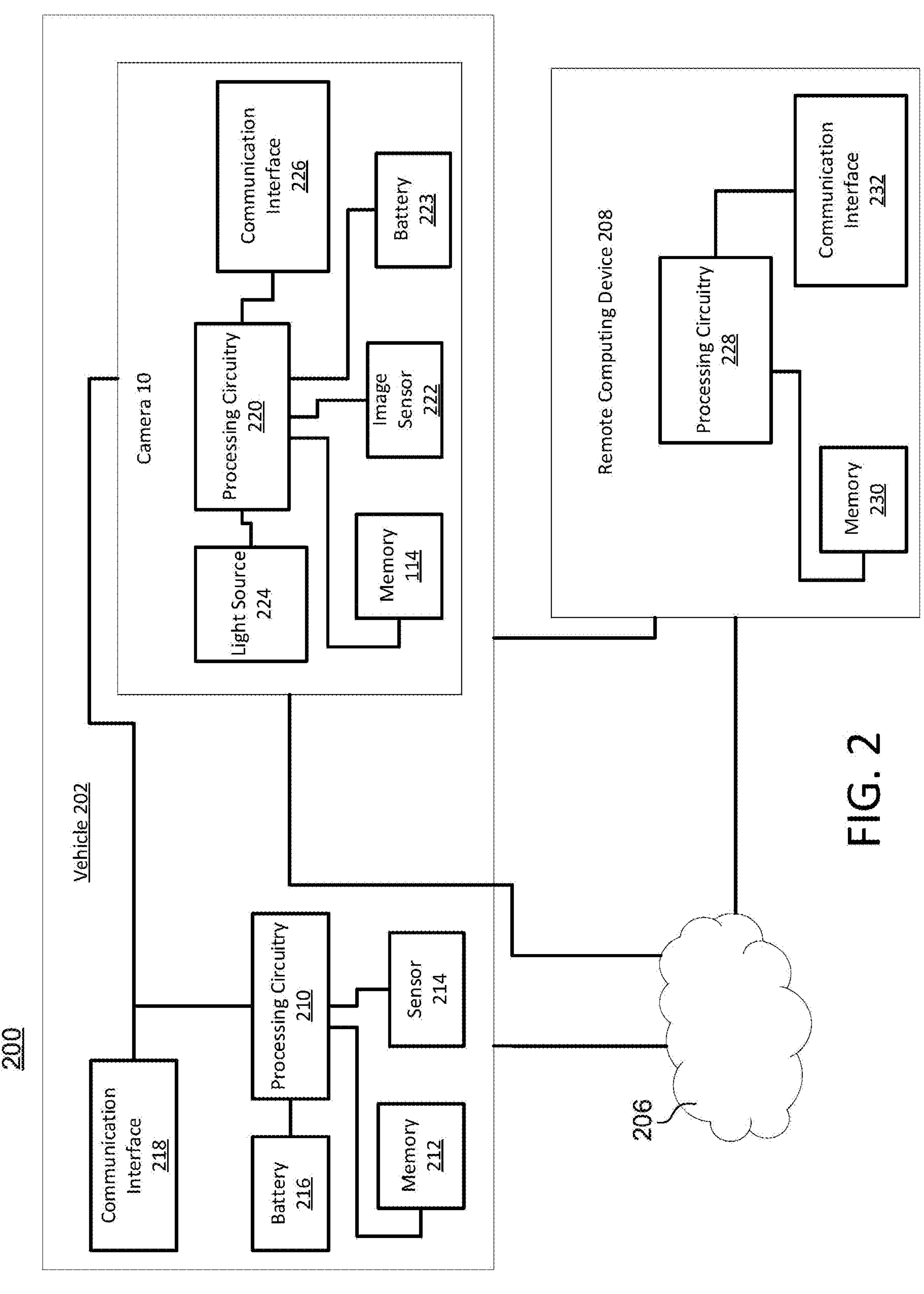
FIG. 2 is a block diagram of an illustrative system for processing ToF data generated by a ToF camera, in accordance with some embodiments of the present disclosure.

In some embodiments, ToF camera 101 may employ a high frequency modulation signal and a low frequency modulation signal as emitted light 102, and may output the different respective phase-stepped measurements 108 (e.g., coarse depth data and fine depth data, determined based on reflected light 104) to split logic 110 (e.g., implemented by processing circuitry 220 of ToF camera 10, as shown in FIG. 2). In some embodiments, the high and low frequency modulation signals may be separate signals, or may be included as part of the same signal. Split logic 110 may select portion 120 of phase-stepped measurements 108 usable to obtain an intensity value and/or coarse depth data value for each pixel (e.g., of image sensor 222 of FIG. 2), and may forward such portion 120 to real-time fusion logic 122 (e.g., implemented by processing circuitry 220 of ToF camera 10, as shown in FIG. 2). Real-time fusion logic 122 may fuse portion 120 with signals from other sensors 112 to control a device or robotic platform 126 (e.g., vehicle 202 of FIG. 2). In some embodiments, split logic 110 may cause phase-stepped measurements 108 to be stored in memory 114, and/or cause data from other sensors 112 to be stored in memory 114, for later processing at post-processing fusion logic 116 (e.g., implemented by processing circuitry 220 of ToF camera 10, and/or processing circuitry 210 of aerial vehicle 202, and/or processing circuitry 228 of remote computing device 208, as shown in FIG. 2). Post-processing fusion logic 116 may output a high-fidelity reconstruction 118 (e.g., a 3D representation of an environment, based on processing fine depth data, or processing the fine depth data and the coarse depth data). In some embodiments, an updated parameter set 124 for the real-time fusion logic 122 may be determined based on the fine 3D representation generated based on the fine depth data and/or the coarse depth data.

In some embodiments, only the lower frequency modulation signal may be processed in real-time, while the signals of one or more of the lower and higher frequency modulations may be stored at memory 114 for later processing. For example, selectively processing only the lower modulation frequency signal in real-time may significantly reduce computational load, while enabling temporal or spatial resolution measurements to be maintained at a suitable precision (e.g., suitable for real-time environmental awareness and robot control, such as, for example, for collision avoidance. Moreover, such selective processing of the lower modulation frequency, or a portion thereof, in real time may result in lower sensing latency, which may be suitable for closed-loop motion control. In some embodiments, since the signals of both modulation frequencies may be stored at memory 114, optionally along with data from other sensors 112, high fidelity reconstruction with high precision can be achieved in a post-processing step 116, e.g., when the device or robotic platform may be at rest and may not be perceiving the environment, and/or such high fidelity reconstruction can be performed in the cloud (e.g., at remote computing device 208 of FIG. 2).

In some embodiments, the low frequency modulation signal and the high frequency modulation signal do not need to be obtained at the same rate. In some embodiments, one or more of such signals can be stored at memory 114 as processed or raw data. In some embodiments, raw, phase-stepped measurements of the low and high frequency signals may be combined into a depth measurement. The phase-stepped measurements such may preprocessed, e.g., via precomputation and/or filtering, and/or only the computed depth images of the low and high modulation signals may be stored at memory 114. In some embodiments, the coarse depth data or image may be stored at memory 114 instead of the phase-stepped measurement of the high-frequency signal. In some embodiments, additionally or alternatively to obtaining the coarse depth image, an intensity image can be retrieved with low latency from one or more of the low or high frequency modulation signal. Such intensity image allows for low-latency, real-time visual odometry with the resulting pose estimate being usable in closed-loop control of a robot.

In some embodiments, the coarse depth information determines for which pixels to save the phase and/or depth information, and/or which complete frames to save. Such aspects may enable the datastream to be compressed and may reduce the memory needed to store the collected data. For example, split logic 110 may only write phase/depth information to memory 114 if particular criteria are fulfilled, e.g., when the coarse depth data is within a certain range or above a predefined threshold, or if a certain scene, object or event can be detected based on the coarse depth data. In some embodiments, information from other sensors 112, e.g., an Inertial Measurement Unit (IMU), which may include at least an accelerometer and a gyroscope, can be utilized in determining whether, or when, to store and process coarse depth data and/or intensity depth data and/or fine depth data. In some embodiments, such information from other sensors may include rotational rates of vehicle components, etc.

In some embodiments, a neural network may be employed to fuse the phase-stepped measurements of the two modulation frequencies in real-time. While the evaluation of a small neural network can be made computationally cheap, it may be computationally expensive to train such a neural network. In some embodiments, storing the data of the low and high frequency modulation signals enables high fidelity reconstructions 118 in a post-processing step, and such high-fidelity reconstructions 118 (and/or intensity information) can be utilized to train or update parameters of the neural network with a supervised learning technique.

While FIG. 1 has been described in the context of dual-frequency, continuous-wave modulation ToF sensors employed on a robotics platform, a person of ordinary skill in the art will understand that any suitable implementation across a variety of ToF technologies and applications may be employed. For example, coded modulation ToF techniques may be employed, where a coarse and fine decorrelation can be utilized in a similar manner as the low and high frequency modulation data of the dual-frequency camera. As another example, the pulse-based ToF techniques may be employed, where signals from large and small pulse widths can be used in a similar manner as the low and high frequency modulation data. In some embodiments, system 100 may be utilized in connection with devices having a touchless interface and/or gesture control capability. In some embodiments, system 100 may be utilized in connection with CCTV cameras employing ToF sensors, by detecting in real-time with one data stream (e.g., coarse depth data) that an object (e.g., a person or a gesture) is appearing at a certain place with respect to the device, and by using the other data stream (e.g., the fine depth data) to identify the object (e.g., the person or gesture), e.g. to unlock a door or a device, provide a notification, or perform any other suitable action.

FIG. 2 is a block diagram of an illustrative system 200 for processing ToF data generated by a ToF camera, in accordance with some embodiments of the present disclosure. System 200 may correspond to or comprise system 100, and may comprise aerial vehicle 202, camera 101 and remote computing device 208, each of which may be in wired communication or wireless communication over network 206 (e.g., the Internet, WAN, LAN, Wi-Fi, cellular network, short-range wireless radio communication network such as, for example, Bluetooth or NFC, etc.). In some embodiments, vehicle 202 may comprise any suitable robot or vehicle, e.g., aerial vehicle (e.g., an unmanned drone, helicopter), a ground-based vehicle (e.g., an unmanned ground vehicle, a crane, a forklift), a watercraft, or any combination thereof, etc. In some embodiments, vehicle 202 may be configured to perform logistics and industrial automation tasks, and/or implement applications ranging from "smart things" through effective tracking of assets, and/or assistance solutions to robots such as automated guided vehicles (AGVs). Such applications may be concerned with maintaining a centralized database of assets (e.g., objects such as, for example, pallets, equipment, products, etc.) and their storage locations in a warehouse, hospital, factory, etc., and monitoring the object's location and updating the centralized database.

Vehicle 202 may comprise processing circuitry 210, memory 212, sensor 214, battery 216 and communication interface 218. Processing circuitry 210 may be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry 210 may be distributed across multiple separate processors or processing units, for example, multiple of the same type of processing units or multiple different processors. In some embodiments, processing circuitry 210 executes instructions for an application stored (e.g., encoded) in computer-readable media (e.g., non-transitory memory 212 and/or non-transitory memory 114). Processing circuitry 210 may be instructed by the application to perform the functions discussed above and below.

Memory 212 may comprise one or more of, for example, Random Access Memory (RAM), Read Only Memory (ROM), EEPROM, ASIC, optical storage, magnetic storage, flash memory, solid state memory, or any combination thereof, or any other suitable medium used to store data. Memory 212 of vehicle 202 and/or memory 114 of camera 101 may be used to store information, e.g., depth information or images, amplitude or intensity information or images, 3D representations of an environment, parameters for coarse depth data processing and/or fine depth data processing, etc. In some embodiments, memory 212 of vehicle 202 and/or memory 114 of camera 101 may be used to buffer data after reception and before transmission.

In some embodiments, vehicle 202 may be configured to operate or navigate autonomously or semi-autonomously, and processing to perform such navigation of vehicle 202 may be performed based on sensor data generated by sensor 214. In some embodiments, sensor 214 may comprise at least one of a camera, accelerometer, magnetometer, gyroscope, laser, sonar, ultrasound sensors, microphones, radio sensors, other height, distance, and range sensors, and infrared sensors, time-of-flight sensors, encoders, orientation sensor, etc. In some embodiments, vehicle 202 may be powered by battery 216, and camera 101 may be powered by battery 223 and/or battery 216 of vehicle 202. Battery 216 and 223 may be rechargeable batteries or non-rechargeable batteries. Communication interface 218 may comprise one or more transceivers and/or antennas configured to communicate with camera 101 and remote computing device 208 via a wired or wireless connection (e.g., communication network 206). In some embodiments, communication interface 218 or communication interface 226 of camera 101 may be configured to transmit any suitable depth information or images, or intensity information or images, or 3D representations generated based on such information to a central server (e.g., remote computing device 208), and/or may be configured to transmit any other suitable data, e.g., data concerning a location of vehicle 202 to a central server (e.g., remote computing device 208). In some embodiments, vehicle 202 and/or camera 101 and/or remote computing device 208 may be operable to provide notifications or information regarding processed data (e.g., provide audio via a speaker, provide images or video via a display).

In some embodiments, vehicle 202 may comprise camera 101 and/or camera 101 may be affixed to vehicle 202. Camera 101 may be a ToF camera, or any other suitable camera. Camera 101 may comprise processing circuitry 220, memory 114, image sensor 222, battery 223, light source 224, and communication interface 226. Processing circuitry 220, memory 114 and communication interface 226 may be implemented in similar manner as processing circuitry 210, memory 212 and communication interface 218, respectively, of vehicle 202. Processing circuitry 220 may be configured to determine depth images or depth data of an environment surrounding camera 101 (e.g., coarse depth data and/or fine depth data received from image sensor 222) and/or intensity information received from image sensor 222, to determine spatial coordinates (x, y and z coordinates) defining the position of objects in the environment. Processing circuitry 220 may be configured to monitor and record depth data and intensity information related to an environment surrounding camera 10, and cause one or more notifications or messages concerning the monitored data to be output or otherwise transmitted by way of communication interface 226. Processing circuitry 220 may be configured to control light source 224 to emit light at particular times and/or modulation frequencies, and/or control image sensor 222 to collect depth and/or intensity data at certain times.

Image sensor 222 may be configured to output depth images and intensity images by capturing signals in the environment surrounding camera 101. To determine depth data, image sensor 222 may be configured to utilize direct ToF techniques, e.g., to determine depth data based on a time light emitted by light source 224 to return to image sensor 222, or indirect ToF techniques, e.g., to measure a phase difference between a phase of light emitted by light source 224 towards an object and a phase of light reflected back towards image sensor 222 from the object. Processing circuitry 220 may be configured to modulate a frequency of the emitted light, and the measured phase difference along with the modulation frequency may be used by processing circuitry to determine depth data (e.g., fine depth data and coarse depth data).

Image sensor 222 may comprise a charge-coupled device (CCD) comprising an array of light-sensitive pixels, photo diodes and/or photosites, where each pixel may be capable of individually determining depth information and intensity information based on reflected light signals. Such depth information may be used to generate a three-dimensional representation or structure of an environment surrounding camera 101. The pixels or capacitors may store charge corresponding to an intensity of light received by each pixel, and such pixels may act as a photodiode to convert photons of specific wavelengths to photocurrent. In some embodiments, image sensor 222 may be complementary metal oxide semiconductor (CMOS) sensors where each pixel comprises a CMOS transistor. Light source 224 may comprise any suitable laser diode, e.g., a vertical-cavity surface-emitting laser (VCSEL), a light-emitting diode (LED) or any other suitable light source. Camera 101 may comprise a lens through which reflected light travels and bends prior to striking image sensor 222. In some embodiments, multiple images may be captured during each exposure time (e.g., switching between high frequency and low frequency modulations, and changing the sampling intervals (e.g. 90 degrees) for the multiple phase-stepped measurements), and by comparing such images a pixel by pixel reconstruction of the phase difference may be determined.

To implement direct ToF techniques, processing circuitry 220 may cause light source 224 to emit one or more pulses for a predefined period of time, where the reflected light may be sampled by the light-sensitive pixels (e.g. by means of single-photon avalanche diodes SPADs), and electric charges collected during such sampling may be used to determine depth data and intensity data. To implement indirect ToF techniques, processing circuitry 220 may control light source 224 and image sensor 222 such that electric charges may be collected for multiple emitted pulses, and such electric charges may be used to determine depth information and intensity information.

In some embodiments, processing circuitry 220 may be configured to generate a 3D representation based on the coarse depth data and/or fine depth data and/or intensity information. For example, one or more of a lower fidelity point cloud and/or a high fidelity point cloud may be generated, comprising one or more vectors of spatial coordinates (x, y and z coordinates) defining the position of objects in the environment, RGB color values of pixels, and intensity values of pixels. In some embodiments, each point cloud may be based on any suitable number of captured image frames (e.g., 2 frames per pulse or 4 frames per pulse). In some embodiments, the captured image frames may be, or may be converted to, gray scale images for further processing. In some embodiments, a depth image may be color coded, e.g., different colors may correspond to different depths, even such information is not evident based on a brightness map.

Remote computing device 208 may comprise processing circuitry 228, memory 230 and communication interface 232. In some embodiments, remote computing device 208 may correspond to cloud computing resources (e.g., centralized computational infrastructure, one or more servers, a data center, etc.) suitable for performing more computationally intensive tasks and storing a significant amount of data. For example, processing intensive tasks such as processing fine depth data may be performed by remote computing device 208, to generate a high-fidelity 3D representation of the environment of camera 10, in response to receiving such fine depth data from camera 101 and/or vehicle 202.

Figure 3:
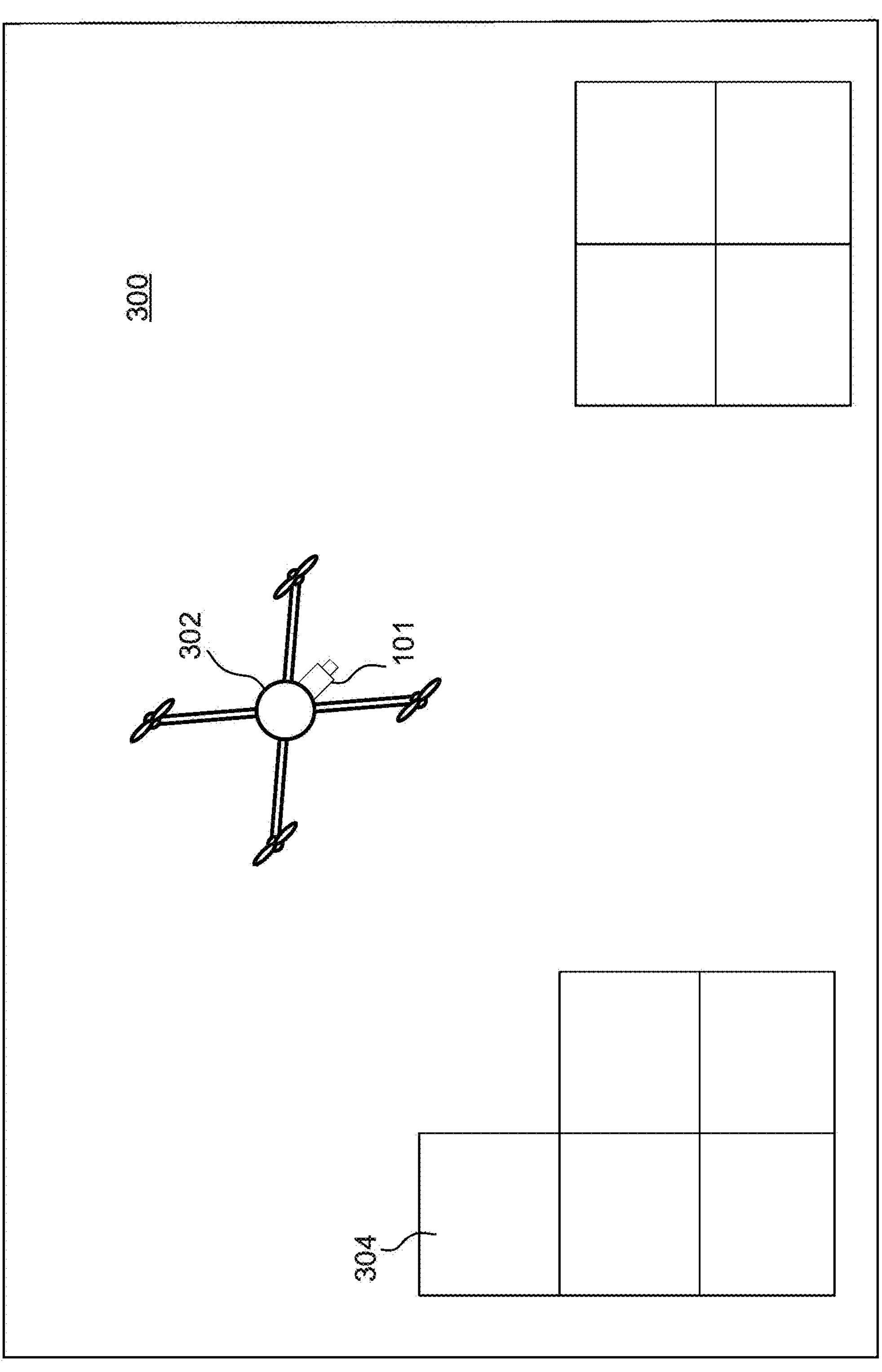
FIG. 3 shows an illustrative scenario in which ToF data may be selectively processed, in accordance with some embodiments of the present disclosure.

FIG. 3 shows an illustrative scenario in which ToF data may be selectively processed, in accordance with some embodiments of the present disclosure. FIG. 3 depicts environment 300, e.g., a warehouse setting, in which vehicle 302 comprising camera 101 may be deployed to perform any suitable task, e.g., to find misplaced objects, detect damaged or missing objects, etc. Vehicle 302 may correspond to vehicle 202, and may be an aerial vehicle, e.g., a drone, comprising a housing, one or more propellers, a motor operable to drive the one or more propellers, etc., to facilitate navigation around environment 300. In some embodiments, vehicle 302 may comprise one or more sensors 214, e.g., one or more ultrasonic sensors and/or one or more laser-based sensors and/or vision sensors (e.g. a camera)

which may be used to measure distance such as the distance from the aerial vehicle to the ground or to an object or obstacle, and output sensor signals containing measurement data representative of such distance, to assist in navigation. Vehicle 302 may be flown to a desired position where an object/scene to be captured is in the field of view of the camera, and once in the field of view the camera may be operable to capture an image of the object/scene, e.g., including depth data and intensity data. In some embodiments, vehicle 302 may collect such data based on commands from an operator, and/or autonomously, e.g., programmed or trained to initiate (automatically) the camera to capture an image when the vehicle is at a predefined position and/or at a predefined time instance.

In some embodiments, coarse depth data and/or intensity information determined by ToF camera 101 may be processed in real time, e.g., as vehicle 302 navigates storage objects (e.g., boxes or pallets) of environment 300, to generate a low-fidelity 3D representation of environment 300. Such low-fidelity 3D representation of environment 300 may suffice for situational awareness and navigational purposes, while conserving computing resources which may otherwise be needed to process fine depth data in real time. Such fine depth data may be stored at memory 114 for processing at a later time (e.g., when camera 101 returns to a rest position and/or is being charged), such as, for example, along with the coarse depth data, to generate a high-fidelity 3D representation of environment 300. In some embodiments, camera 101 and/or vehicle may transmit, in real-time or a later time, the fine depth data to remote computing device 208, for processing at remote computing device 208 (e.g., in real time or at a later time).

In some embodiments, to preserve storage and memory resources, the coarse depth data (and/or 3D representation generated based on the coarse depth data) and/or intensity data and/or the fine depth data may be selectively stored at memory 114. For example, processing circuitry 220 may apply particular criteria to determine whether the coarse depth data and/or intensity data and/or the fine depth data should be stored. As an example of the particular criteria, if camera 101 of vehicle 302 detects based on a current datastream of coarse depth data and/or intensity data that an obstacle is detected in a field of view of camera 10, the coarse depth data and/or intensity data and/or the fine depth data associated with the detected obstacle event may be stored in response to such detection of the obstacle. In some embodiments, the coarse depth data and/or intensity data and/or the fine depth data may be stored only if processing circuitry 220 determines, based on the coarse depth data and/or intensity data (e.g., detected while vehicle 202 performs collision avoidance), that the obstacle likely corresponds to a particular type of object (e.g., pallets or a storage box, as opposed to a wall, floors or a ceiling which may not necessitate storing the data), and/or that the obstacle is unexpected (e.g., historical information of environment 300 indicates that the obstacle was not previously detected). In some embodiments, the particular criteria may comprise comparing a coarse depth data value or intensity data value to a predefined threshold value. For example, if a depth data value or intensity value is determined to be less (or more) than an expected value or threshold, processing circuitry 220 may cause fine depth data, and/or such coarse depth data and/or intensity data to be stored.

In some embodiments, ToF camera 101 may capture a plurality of image frames at any given time, and the particular criteria may be used by processing circuitry 220 to determine which image frames, or which pixels regions of a particular image frame, to be stored. For example, based on historical data of environment 300, processing circuitry 220 may expect that a particular portion of environment 300 is empty and devoid of any objects. If processing circuitry 220 detects in real time that a particular object, scene or event is present or is occurring in such particular portion, processing circuitry 220 can extract a subset of coarse depth data and/or intensity data and/or fine depth data from the captured image frames of such particular portion and selectively store only certain image frames or certain portions thereof. For example, the extracted frames or portions may correspond to the pixels of interest, e.g., in a region at which the particular object, event or scene is detected. In some embodiments, once vehicle 202 returns to a rest position and/or is charging, the coarse depth data and/or intensity data and/or fine depth data may be processed and fused together to generate a high fidelity 3D representation and/or to categorize a particular type of obstacle, event or scene, and the processed data may be reported to remote computing device 208. In some embodiments, classifying the type of obstacle, event or scene may be performed using any suitable technique, e.g., image processing techniques and/or machine learning techniques to extract features of the object or scene, and comparison to known objects or scenes. In some embodiments, if an obstacle of an unknown type, a determination may be made whether to perform processing and/or storage of fine-depth data in real-time, and/or a notification may be transmitted if such obstacle is detected in a high traffic area (e.g., a main hallway).

In some embodiments, if processing circuitry 220 determines that a detected obstacle is of a particular type (e.g., a person likely to be present for a transitory period), coarse data and/or intensity data and/or fine depth data associated with the detected obstacle may be discarded. On the other hand, if the detected obstacle is determined to be an object or scene of interest (e.g., a pallet) that is not expected to be in this particular location, this can be reported to remote computing device 208 so each vehicle 202 of a fleet of vehicles can be notified. In some embodiments, exact measurements of the object can be performed (e.g., based at least in part on the fine depth data) once vehicle 202 is at rest or otherwise has a relatively low processing load, and such exact measurements may be reported to remote computing device 208. Accordingly, processing of low resolution images may be performed continuously, and processing circuitry 220 may determine whether to store all high resolution images or selectively store only certain high resolution images or portions thereof. In some embodiments, camera 101 may be implemented as a security camera (e.g., CCTV camera), which checks whether a person is walking within a field of view of the camera, and if so, fine depth data may be stored for processing at a later time. In some embodiments, a set of coarse, lower-fidelity data processing parameters may be updated in dependence of the coarse depth data and fine depth data (e.g., and/or the high-fidelity 3D representation or point cloud associated therewith), and such updated coarse, lower-fidelity processing parameters may be stored in memory 114 (and/or memory 212 and memory 230).

Figure 4:
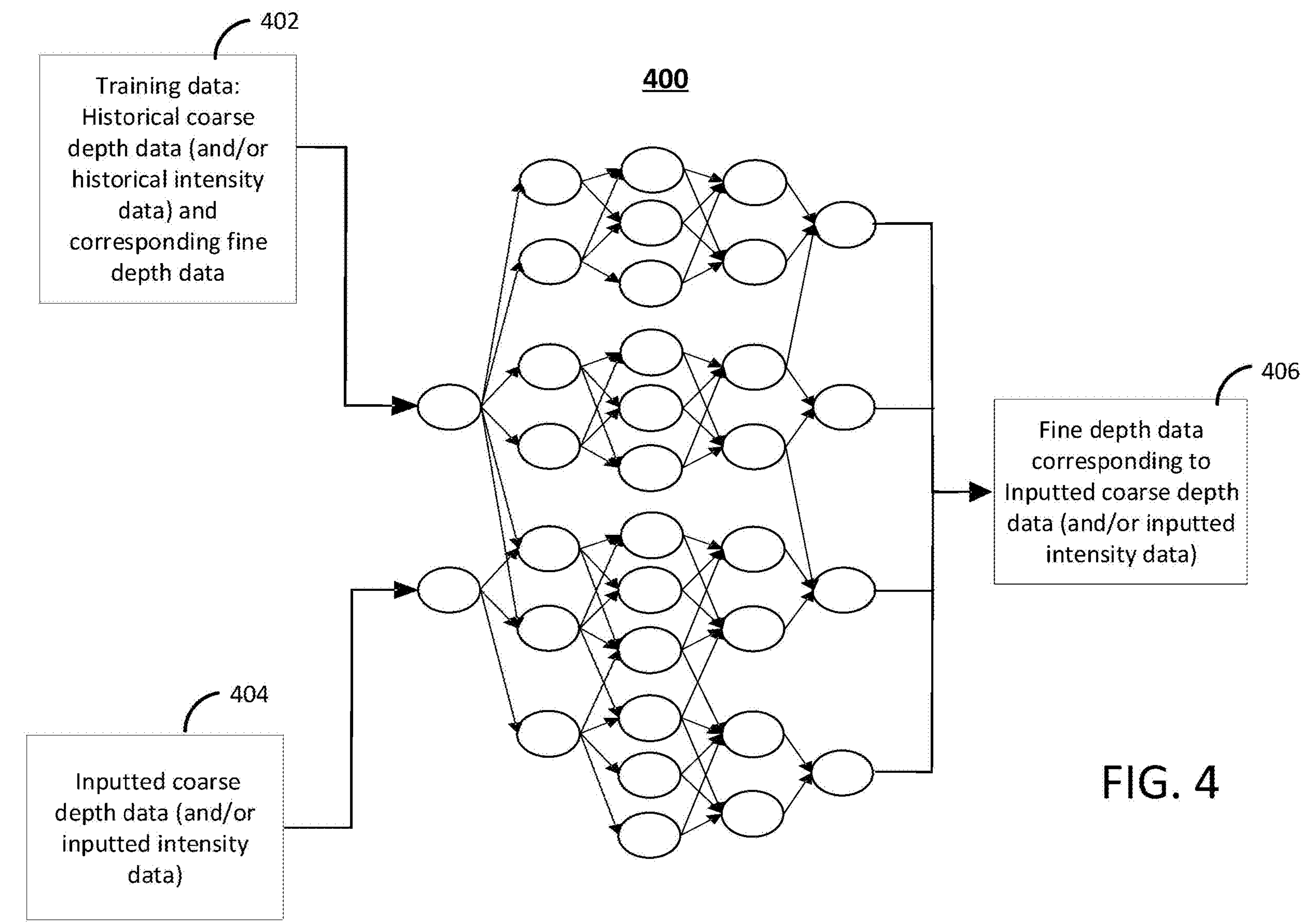
FIG. 4 is a block diagram of an illustrative machine learning model, in accordance with some embodiments of the present disclosure.

FIG. 4 is a block diagram of an illustrative machine learning model 400, in accordance with some embodiments of the present disclosure. Machine learning model 400 may comprise one or more machine learning models, e.g., a neural network or any other suitable machine learning model. In some embodiments, machine learning model 400 may be trained with training data 402, which may comprise historical coarse depth data (and/or historical intensity data)

and fine depth data corresponding to such historical coarse depth data (and/or historical intensity data). For example, previous data generated by camera 101 (and any other suitable cameras) may be used to train machine learning model 400 to learn patterns or characteristics of coarse depth data and/or intensity data predictive of a certain types or characteristics of coarse depth data (and/or 3D representation generated based on the coarse depth data). In some embodiments, training data 402 may be input to machine learning model 400 in vector form, encoding the coarse depth data and/or intensity depth data and corresponding fine depth data, and any suitable pre-processing may be performed. The trained machine learning model may receive inputted coarse depth data (and/or intensity depth data) 404, and generate fine depth data 406 corresponding to such inputted data, by predicting what the fine depth data should look like based on historical patterns and correlations between coarse depth data (and/or intensity data) and fine depth data pairs.

In some embodiments, training data 402 may include information indicative of certain environments. For example, an environment indoors at a warehouse may exhibit different characteristics than an outdoor environment, and machine learning model 400 may learn such characteristics for particular environments over time. In some embodiments, training data 402 may include information indicative of certain objects or scenes. For example, machine learning model 400 may learn properties typically associated with a partial object (e.g., a pallet). In some embodiments, machine learning model 400 may be implemented at any of device 202, camera 101 and/or computing device 208. In some embodiments, training of machine learning model 400 may be computationally intensive and may be performed at remote computing device 208, which may be capable of efficiently handling large computational loads. In some embodiments, vehicle 202 may implement machine learning model 400 when at rest and not perceiving its environment, e.g., while battery 223 is being charged. In some embodiments, when fusing together coarse depth data and/or intensity depth data and/or predicted fine depth data, the trained machine learning model may determine for each pixel whether to utilize the coarse depth data or the fine depth data, and machine learning model 400 may be configured to output quality metrics.

Figure 5:
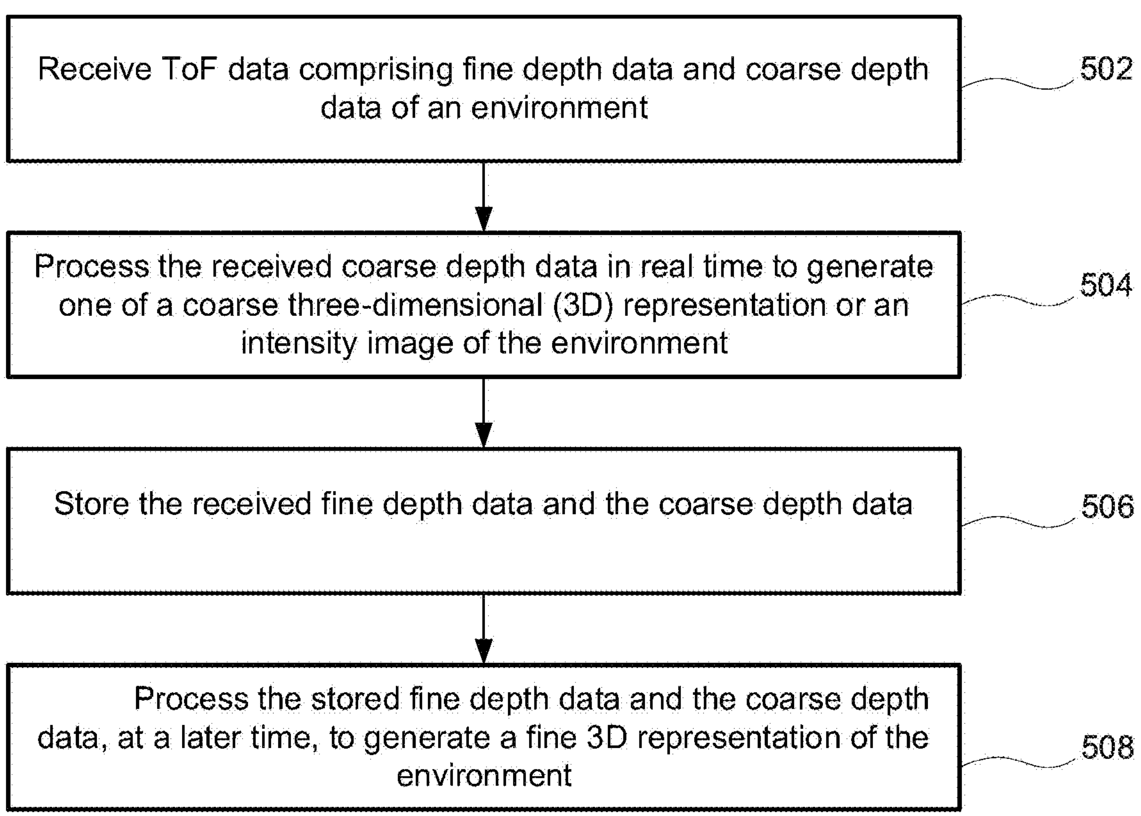
FIG. 5 is an illustrative flow chart of an illustrative process for processing ToF data generated by a ToF camera, in accordance with some embodiments of the present disclosure.

FIG. 5 is an illustrative flow chart of an illustrative process for processing ToF data generated by a ToF camera, in accordance with some embodiments of the present disclosure. Process 500 may be executed at least in part by processing circuitry 220 of camera 10, or any other suitable component of FIGS. 1-4.

At 502, processing circuitry 220 of camera 101 may receive (e.g., from image sensor 222 of camera 10) ToF data comprising fine depth data and coarse depth data of an environment. In some embodiments, camera 101 may be a ToF camera, and may utilize any suitable direct or indirect ToF technique to cause light source 224 to emit light 102 and image sensor 222 to receive reflected light 104, and generate the fine depth data and coarse depth data based on properties of emitted light 102 and reflected light 104.

At 504, processing circuitry 220 may process the received coarse depth data in real time to generate one of a coarse three-dimensional (3D) representation or an intensity image of the environment. For example, camera 101 may be included as a part of or otherwise affixed to aerial vehicle 302, which may be navigating an environment autonomously or semi-autonomously, and camera 101 may determine depth information regarding its environment and intensity or amplitude information of the captured images. Such coarse depth information (and/or intensity information) may be usable to generate a 3D representation (e.g., a point cloud) of the environment while vehicle 302 is navigating or being operated, and/or to generate an intensity image. The fine depth data may not be processed in real time.

At 506, processing circuitry 220 may store the received fine depth data and the coarse depth data at memory 114 of camera 10, or communicate with vehicle 202 to store such data at memory 212 of vehicle 202.

At 508, processing circuitry 220 may process the stored fine depth data and the coarse depth data, at a later time, to generate a fine 3D representation of the environment. For example, such processing at 508 may be performed in response to determining that vehicle 202 is at rest (e.g., at a charging station), not perceiving its environment or otherwise has a low processing load. In some embodiments, such processing may be offloaded to remote computing device 208. In some embodiments, at 508, processing circuitry 220 may instead output the stored fine depth data and the coarse depth data at a later time for processing by processing circuitry 210 and/or 228.

Figure 6:
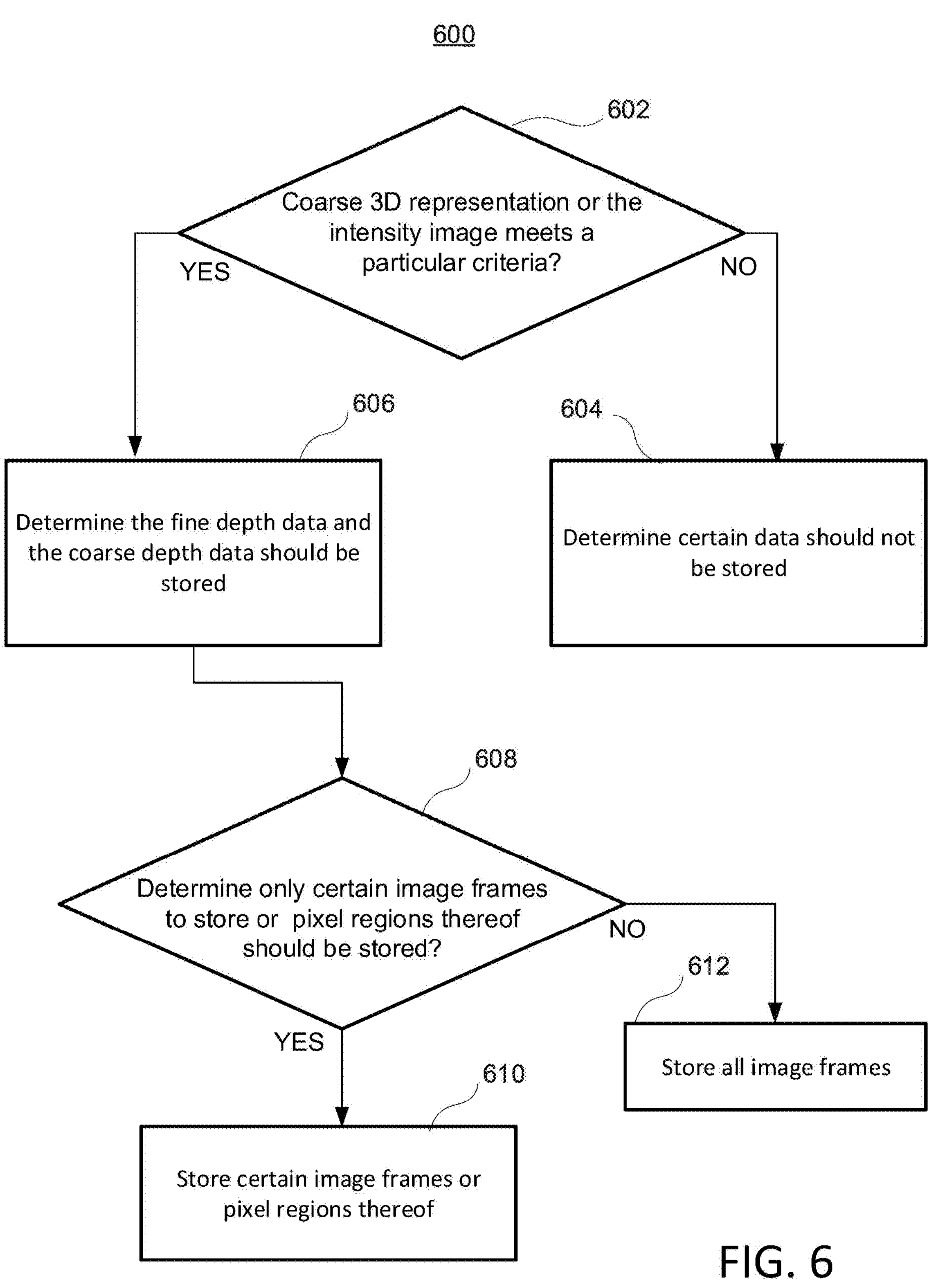
FIG. 6 is an illustrative flow chart of an illustrative process for processing ToF data generated by a ToF camera, in accordance with some embodiments of the present disclosure.

FIG. 6 is an illustrative flow chart of an illustrative process for processing ToF data generated by a ToF camera, in accordance with some embodiments of the present disclosure. Process 600 may be executed at least in part by processing circuitry 220, or any other suitable component of FIGS. 1-4.

At 602, processing circuitry 220 may determine whether the coarse 3D representation (generated by 504 of FIG. 5) meets one or more particular criteria. For example, processing circuitry 220 may compare values associated with one or more of the coarse 3D representation and/or the coarse depth data used to generate such representation and/or the intensity image to a certain predefined threshold value, and/or may determine whether one or more of such values are indicative of the presence of a particular object or event occurring in the environment surrounding camera 101. In some embodiments, one or more of such values may be compared to historical values, to determine whether a detected obstacle or object or event may be unexpected. If processing circuitry 220 determines that such criteria is not met, processing may proceed to 604. Otherwise, processing may proceed to 606.

At 604, processing circuitry 220 may determine that certain data should not be stored. For example, one or more of the coarse 3D representation and/or the coarse depth data used to generate such representation and/or the intensity image may be discarded if none of the above-mentioned criteria is met.

At 606, processing circuitry 220 may determine that the fine depth data and the coarse depth data (and/or the intensity information) should be stored, e.g., at memory 114 or memory 212, and processing may proceed to 608.

At 608, processing circuitry 220 may determine whether only certain image frames, or pixel regions thereof, corresponding to the determined depth data or image and/or intensity image should be stored. For example, processing circuitry 220 may identify that certain captured frames (or certain pixel regions thereof), from among a plurality of captured frames, depict an object of interest (e.g., a missing storage box, a misplaced item, or an object or obstacle not expected to be present at the particular location). If an affirmative determination is made at 608, processing may proceed to 610; otherwise processing may proceed to 612.

At 610, processing circuitry 220 may store the certain frames, or particular pixel regions thereof, determined at 608, for further processing. In some embodiments, certain frames, or particular pixel regions thereof, may comprise fine depth data and/or coarse depth data and/or intensity information which may be processed at a later time (e.g., not in real time) to generate a high fidelity 3D representation of an environment of camera 101.

At 612, processing circuitry 220 may store each of the captured image frames. For example, for certain tasks (e.g., mapping an environment), it may be desirable to utilize each captured frame, even if each captured frame may not include an object of interest.

While certain aspects of the present invention have been particularly shown and described with reference to exemplary embodiments thereof, it will be understood by those of ordinary skill in the art that various changes in form and details may be made therein without departing from the spirit and scope of the present invention as defined by the following claims. It will also be understood that components of the present disclosure may comprise hardware components or a combination of hardware and software components. The hardware components may comprise any suitable tangible components that are structured or arranged to operate as described herein. Some of the hardware components may comprise processing circuitry (e.g., a processor or a group of processors) to perform the operations described herein. The software components may comprise code recorded on a tangible computer-readable medium. The processing circuitry may be configured by the software components to perform the described operations.

What is claimed:

1. A method for processing time of flight (ToF) data generated by a ToF camera of an autonomous vehicle, the method comprising:

receiving, at the autonomous vehicle, the ToF data comprising fine depth data and coarse depth data of an environment;

processing, at the autonomous vehicle, the received coarse depth data in real time to generate one of a coarse three-dimensional (3D) representation or an intensity image of the environment;

storing, at the autonomous vehicle, the received fine depth data and the coarse depth data; and transmitting the stored fine depth data and the stored coarse depth data from the autonomous vehicle to a remote computing device, to enable the remote computing device to perform processing, at a later time, of the stored fine depth data and the coarse depth data to generate a fine 3D representation of the environment.

2. The method of claim 1, wherein the coarse 3D representation comprises a low-fidelity point cloud and wherein the fine 3D representation comprises a high-fidelity point cloud.

3. The method of claim 1, further comprising:

determining whether the one of the coarse 3D representation or the intensity image meets criteria, wherein the storing of the fine depth data and the coarse depth data is performed in response to determining the criteria is met.

4. The method of claim 3, wherein determining whether the criteria is met comprises one of:

determining whether a depth value of the coarse 3D representation is less than a predefined threshold; or determining whether a particular scene or event is detected based on the coarse depth data or the intensity image.

5. The method of claim 1, wherein the ToF data comprises image frames, the method further comprising:

identifying which image frames to store or identifying which pixel regions of the image frames to store based on criteria, wherein the storing of the fine depth data and the coarse depth data comprises storing the identified image frames or the identified pixel regions.

6. The method of claim 1, further comprising:

updating a coarse depth data processing parameter based on the fine 3D representation or the coarse depth data; and storing the updated coarse depth data processing parameter.

7. The method of claim 1, wherein the coarse depth data and the fine depth data are determined based on one of:

a high frequency modulation signal emitted by the ToF camera, associated with the fine depth data, and a low frequency modulation signal emitted by the ToF camera, associated with the coarse depth data;

a first signal emitted by the ToF camera corresponding to a relatively larger pulse width and associated with the coarse depth data, and a second signal emitted by the ToF camera corresponding to a relatively smaller pulse width and associated with the fine depth data;

a coded modulation signal; or a first signal emitted by the ToF camera and having a relatively lower pulse repetition frequency, wherein a second signal with a relatively higher pulse repetition frequency corresponding to the fine depth data is adjusted based on a distance extracted from the coarse depth data.

8. The method of claim 1, wherein the processing of the fine depth data and the coarse depth data to generate the fine 3D representation of the environment is performed at the remote computing device while the ToF camera is not detecting its environment.

9. The method of claim 1, further comprising:

navigating the autonomous vehicle through the environment in real time based on the coarse 3D representation or the intensity image of the environment.

10. The method of claim 1, wherein the ToF data comprises image frames of raw, phase-stepped measurements of low and high frequency signals.

11. The method of claim 1, further comprising:

determining whether the one of the coarse 3D representation or the intensity image meets criteria, wherein the transmitting of the fine depth data and the coarse depth data is performed in response to determining the criteria is met.

12. A system for processing time of flight (ToF) data generated by a ToF camera of an autonomous vehicle, the system comprising:

memory; and processing circuitry configured to:

receive, at the autonomous vehicle, the ToF data comprising fine depth data and coarse depth data of an environment;

process, at the autonomous vehicle, the received coarse depth data in real time to generate one of a coarse three-dimensional (3D) representation or an intensity image of the environment;

store, at the autonomous vehicle, the received fine depth data and the coarse depth data; and transmit the stored fine depth data and the stored coarse depth data from the autonomous vehicle to a remote computing device, to enable the remote computing device to perform processing, at a later time, of the stored fine depth data and the coarse depth data to generate a fine 3D representation of the environment.

13. The system of claim 12, wherein the generated coarse 3D representation comprises a low-fidelity point cloud and wherein the generated fine 3D representation comprises a high-fidelity point cloud.

14. The system of claim 12, wherein the processing circuitry is further configured to:

determine whether the one of the coarse 3D representation or the intensity image meets criteria; and perform the storing of the fine depth data and the coarse depth data in response to determining the criteria is met.

15. The system of claim 14, wherein the processing circuitry is configured to determine whether the criteria is met based on one of:

determining whether a depth value of the coarse 3D representation is less than a predefined threshold; or determining whether a particular scene or event is detected based on the coarse depth data or the intensity image.

16. The system of claim 12, wherein the ToF data comprises image frames, and the processing circuitry is further configured to:

identify which image frames to store or identifying which pixel regions of the image frames to store based on criteria; and store the fine depth data and the coarse depth data by storing the identified image frames or the identified pixel regions.

17. The system of claim 12, wherein the processing circuitry is further configured to:

update a coarse depth data processing parameter based on the fine 3D representation or the coarse depth data; and store the updated coarse depth data processing parameter.

18. The system of claim 12, wherein the processing circuitry is configured to determine the coarse depth data and the fine depth data based on one of:

a high frequency modulation signal emitted by the ToF camera, associated with the fine depth data, and a low frequency modulation signal emitted by the ToF camera, associated with the coarse depth data;

a first signal emitted by the ToF camera corresponding to a relatively larger pulse width and associated with the coarse depth data, and a second signal emitted by the ToF camera corresponding to a relatively smaller pulse width and associated with the fine depth data;

a coded modulation signal; or a first signal emitted by the ToF camera and having a relatively lower pulse repetition frequency, wherein a second signal with a relatively higher pulse repetition frequency corresponding to the fine depth data is adjusted based on a distance extracted from the coarse depth data.

19. The system of claim 12, wherein the remote computing device performs the processing of the fine depth data and the coarse depth data to generate the fine 3D representation of the surrounding environment while the ToF camera is not detecting its environment.

20. The system of claim 12, wherein the processing circuitry is further configured to:

navigate the autonomous vehicle through the environment in real time based on the coarse 3D representation or the intensity image of the environment.

21. The system of claim 12, wherein the processing circuitry is further configured to:

determine whether the one of the coarse 3D representation or the intensity image meets criteria; and perform the transmitting of the fine depth data and the coarse depth data in response to determining the criteria is met.

22. An autonomous vehicle, comprising:

a time of flight (ToF) camera configured to generate ToF data of an environment outside of the autonomous aerial vehicle, wherein the ToF data comprises fine depth data and coarse depth data;

memory; and processing circuitry configured to:

receive the ToF data;

process the received coarse depth data in real time to generate one of a coarse three-dimensional (3D) representation or an intensity image of the environment;

store, in the memory, the received fine depth data and the coarse depth data; and transmit the stored fine depth data and the stored coarse depth data from the autonomous vehicle to a remote computing device, to enable the remote computing device to perform processing, at a later time, of the stored fine depth data and the coarse depth data to generate a fine 3D representation of the environment.

* * * * *